United States Patent [19]

Kliment

[11] 3,868,447

[45] Feb. 25, 1975

[54] HEMA PASTE

[75] Inventor: Karel Kliment, Princeton, N.J.

[73] Assignee: National Patent Development Corporation, New York, N.Y.

[22] Filed: Feb. 2, 1972

[21] Appl. No.: 223,002

[52] U.S. Cl.................. 424/81, 32/15, 252/522, 260/29.6, 426/221
[51] Int. Cl............................................. A61k 5/00
[58] Field of Search...................... 424/81; 260/29.6

[56] References Cited
UNITED STATES PATENTS

| | | | |
|---|---|---|---|
| 2,624,690 | 1/1953 | Leader | 424/81 |
| 3,003,988 | 10/1961 | Germann et al. | 260/33.6 |
| 3,203,918 | 8/1965 | Goldberg et al. | 260/29.6 |
| 3,284,394 | 11/1966 | Suen et al. | 260/29.6 |
| 3,311,583 | 3/1967 | Bearden | 260/29.6 |
| 3,419,506 | 12/1968 | Gander | 260/2.5 |
| 3,462,839 | 8/1969 | Boyer et al. | 32/15 |
| 3,574,822 | 4/1971 | Shepherd et al. | 424/47 |
| 3,575,946 | 4/1971 | Chromacek et al. | 260/86.1 |
| 3,577,516 | 5/1971 | Gould et al. | 424/46 |

*Primary Examiner*—Shep K. Rose
*Attorney, Agent, or Firm*—Cushman, Darby & Cushman

[57] ABSTRACT

A paste is made of an organic solvent soluble hydrophilic copolymer of a hydroxy lower alkyl acrylate or methacrylate and 0.01 to 50%, preferably 0.05 to 1%, of the diester of a glycol and acrylic acid or methacrylic, an active inorganic filler, e.g. silica and an organic solvent for the copolymer.

18 Claims, No Drawings

HEMA PASTE

The present invention relates to pastes made from organic solvent soluble polymers of hydroxyalkyl acrylates and methacrylates and the like.

There are known pastes made with cellulose, PVA (polyvinyl alcohol) or oil bases, which are used for some special purposes. For example, in echo-encephalography (a method for examining the brain with ultrasound waves) they are used for filling the space between the electrodes and the surface of the skull. Another use of oil-based pastes is as carriers of local anaesthetics in dental surgery, or as protective layers over fillings during setting. These pastes are usually water-insoluble, which makes their removal sometimes messy, and if watersoluble they have no holding power in water.

It has now been found that noncross-linked or linear organic solvent soluble, hydrophilic copolymers of a monoester having the formula

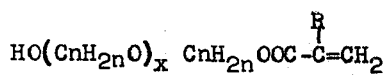

with 0.01 to 50% of a diester of the formula

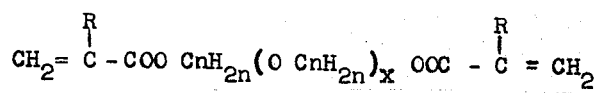

where R is hydrogen or methyl, n is 2 or 3 and x is zero, 1 or 2 can be used to make novel paste compositions. Preferably n is 2. Most preferably R is methyl and x is zero. Also most preferably the amount of diester is between 0.05 and 1% of the copolymer.

Unless otherwise indicated all parts and percentages are by weight.

There can be used for example copolymers of hydroxyethyl methacrylate (HEMA), hydroxyethyl acrylate, hydroxypropyl acrylate, hydroxypropyl methacrylate, hydroxyethoxyethyl methacrylate, hydroxyethoxyethoxyethyl methacrylate,hydroxyethoxyethyl acrylate, hydroxyethoxyethoxyethyl acrylate or hydroxypropoxypropyl methacrylate with ethylene glycol diacrylate (ethylene diacrylate), ethylene glycol dimethacrylate, diethylene glycol diacrylate, diethylene glycol dimethacrylate, triethylene glycol diacrylate, triethylene glycol dimethacrylate, propylene glycol diacrylate, dipropylene glycol diacrylate, propylene glycol dimethacrylate and dipropylene glycol dimethacrylate.

The soluble hydrophilic copolymer can be made in the manner described in Chromecek, U.S. Pat. No. 3,575,946 issued Apr. 20, 1971. Alternatively they can be made as described in the Kliment and Rutherford application entitled "Process of Preparing Soluble HEMA Based Polymers" Ser. No. 186,796, filed Oct. 5, 1971 now U.S. Pat. No. 3,784,540, dated Jan. 8, 1974. The entire disclosures of the Chromecek patent and the Kliment et al application are hereby incorporated by reference. Any of the soluble copolymers disclosed in the Chromecek patent or the Kliment et al application can be employed. The soluble copolymer can range in molecular weight from as low as 50,000 up to several million, e.g. up to 14 million.

To make the paste there is employed in the composition 2–5% of the copolymer, 5 to 10% of an active filler and the balance an organic solvent for the copolymer.

As fillers there can be used silica, e.g. Aerosil which is a colloidal, pyrogenic silica, activated carbon, alumina and diatomaceous earth. Best results are obtained with a fluid oxide of silica such as Aerosil. The fillers are finely divided, e.g. particle size of 0.1 to 100 microns.

The solvent used in the first place must be a good solvent for the polymer itself, preferably soluble in water, non-toxic and non-irritating. Some of the suitable solvents are glyceroldiacetate (diacetine), propyleneglycol, Cellosolves (e.g. methoxyethanol and ethoxyethanol), 1,2 propanediolcarbonate, ethylene carbonate, dipropylene glycol, butanol, pentanol, diethylene glycol, triethylene glycol, t-butanol, ethylene glycol, ethanol, methanol, dimethyl formamide, dimethyl sulfoxide, tetrahydrofurfuryl alcohol, allyl alcohol, pyridine and formamide. There can also be used mixtures of such solvents with up to 60% (based on the total composition) of glycerine or pentaerythritol.

The pastes of the invention can be employed in the above-indicated uses, e.g. in echo-encephalography, as carriers of local anesthetics in dental surgery or as protective layers over dental fillings during setting. They also have other uses as set forth hereinafter.

These pastes have several great advantages. They can be easily prepared in a wide variety of consistencies, they are highly thixotropic, but their "greasing" properties are excellent, they do not dampen ultra-sound waves, they are only partially soluble in water, which means that they hold well in water, but at the other hand can easily be removed when wetted by the slightest rubbing, and are good carriers of water-soluble active ingredients, be it biologically active substances, fragrances, colors or flavors, because when in water the polymer will precipitate as a white, soft layer which will remain in contact with the skin or mucous for several minutes (10 to 20, depending on conditions).

Examples of flavors, coloring agents and fragrances are Firmenich 16,304–23,596–667,608, oil of orchids, attar of roses, lemon oil, peppermint oil, lavender oil, anise, amyl acetate, caramel, strawberry, cherry, butterscotch, vanilla, coffee, biacetyl, citral, orange oil, lilac fragrance, pine fragrance, and ethyl propionate.

Examples of biologically active substances are Novocaine (procaine hydrochloride), Benzocaine (ethyl aminobenzoate), ascorbic acid, butacaine sulfate, dibucaine hydrochloride, riboflavin, thiamine, nicotinic acid, Vitamin $D_2$, Vitamin E, Vitamin K, Bacitracin, hexachlorophene, lincomycin hydrochloride, sulfadiazine, procaine penicillin, aureomycin, streptomycin, terramycin, chloramphenicol, penicillin, neomycin sulfate, succinoylsulfathiazole, cetyl pyridinium chloride, trimethyl benzyl ammonium chloride, triethyl dodecyl ammonium bromide, sulfathiazole, sulfanilamide, phenobarbital, pentabarbital sodium, butabarbital, diethyl stilbesterol, progasterone, testosterone, Nilevar, amobarbital, secobarbital sodium, sodium phenobarbital, pentaerythritol tetranitrate, nitroglycerine, amphetamine sulfate, damphetamine sulfate, griseofulvin, ketophenylbutazone, tetracycline, 6-azarridine riboside, nicotinic acid hydrozide, p-amino salicylic acid, aspirin, xylocaine, cortisone, estradiol. Particularly preferred drugs are local anesthetics, disinfectants or antibiotics.

EXAMPLE 1

4.3 weight percent of linear soluble hydroxy ethyl methacrylate-ethylene glycol dimethacrylate (Hydron) having an intrinsic viscosity in dimethylformamide $[n]_{25} = 1.48$, coefficient of branching $q = 0.62$ and MW $= 1.55 \times 10^6$, (0.43% diester) was dissolved in 88.5 weight percent of diacetine (a mixture of 1,2 and 1,3 glyceroldiacetates). Into the solution 7.2 weight percent of active silica filler (Aerosil Degussa) was intimately mixed, using a blender.

The resulting paste was very viscous, non-flowing, highly thixotropic. It was used as a contact-paste for echoencephalography. When put in between the electrode and skin it did not flow off. It was an excellent conductor for ultra-sound waves and after the measurement was easily wiped off and cleaned with a wetted sponge or cloth.

EXAMPLE 2

2.2 weight percent of linear soluble HYDRON polymer (0.51% diester), having an intrinsic viscosity in dimethylformamide $[n]_{25} = 1.96$, coefficient of branching $q = 0.65$ and MW $= 1.9 \times 10^6$, was dissolved in 29.0 weight percent of diacetine. Into the solution 58.0 weight percent of glycerol was slowly added so that no precipitation of the polymer would occur. 10.8 weight percent of active silica filler (Aerosil Degussa) was intimately blended into the mixture.

Again a very viscous, non-flowing paste was obtained, which was used in echo-encephalography as in example 1.

EXAMPLE 3

5.0 weight percent of linear soluble HYDRON polymer (0.36% diester), having an intrinsic viscosity in methyl Cellosolve $[n]_{25} = 0.34$, MW $= 110,000$, was dissolved in 90 weight percent of diacetine. Into the solution 5.0 weight percent of active silica filler (Aerosil Degussa) was intimately blended.

The resulting paste was used as a base for local anesthetic carrier in dental surgery, combined with an anesthetic, e.g. 1.5% of Novocaine or Benzocaine and a suitable flavor. It was soft, but non-flowing, and in water holds for 9 to 10 minutes before disintegrating.

EXAMPLE 4

The same paste as in example 3, only this time 6.5 weight percent of the same soluble HYDRON polymer was used and 5.0 weight percent active filler in 88.5 weight percent of diacetine.

The resulting paste is much tougher in consistency and when used as a carrier of a local anesthetic, e.g. Novocaine in dental surgery, holds in water for 14-16 minutes before disintegrating.

EXAMPLE 5

0.5 weight percent of the same linear soluble HYDRON polymer as in example 1 was dissolved in 20.0 weight percent of methyl-Cellosolve and into the resulting mixture 69.5 weight percent of glycerol was gradually added. 10.0 weight percent of active silica filler (Aerosil Degussa) was intimately blended into the solution.

The resulting paste has excellent "greasing" properties and can be used as a water-soluble grease for ground glass joints of chemical apparatus.

EXAMPLE 6

A similar paste to that in example 5, but employing only 0.2 weight percent of the same soluble linear HYDRON polymer and using 20.3 weight percent of diacetine in place of the methyl Cellosolve was prepared.

EXAMPLE 7

5.0 weight percent of the same linear soluble HYDRON polymer as in example 3 was dissolved in 86.0 weight percent of propyleneglycol and into the resulting solution 9.0 weight percent of active silica filler (e.g. Cabosil, a flame hydrated silica) was introduced on a blender. The resulting highly viscous paste was used as a cover for dental fillings when setting.

There can be used 0.1 to 5.0% of the biologically active material or flavoring agent or coloring agent based on the total composition. As is shown in the examples the amount of hydrophilic polymer can be from 0.2 to 6.5% and the filler can be 5 to 10.8%.

What is claimed is:

1. A paste consisting essentially of (1) 0.2 to 6.5% of a non cross-linked, organic solvent soluble, hydrophilic copolymer of a monoester having the formula:

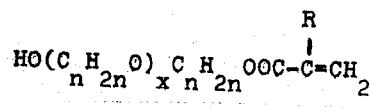

with 0.01 to 50% of a diester of the formula

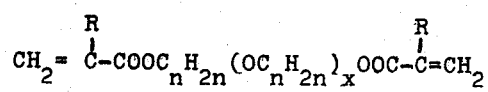

where R is hydrogen or methyl, n is 2 or 3 and x is zero, 1 or 2, (2) 5 to 10.8% of a finely divided activated inorganic filler selected from the group consisting of activated carbon, silica, alumina and diatomaceous earth, and (3) the balance an organic solvent for the copolymer, said paste having incorporated therein a biologically active drug material.

2. A paste according to claim 1 wherein the filler is silica, alumina or diatomaceous earth.

3. A paste according to claim 2 wherein the diester is present in an amount up to 1% in the copolymer.

4. A paste according to claim 3 wherein R is methyl.

5. A paste according to claim 4 wherein $n$ is 2 and $x$ is zero.

6. A paste according to claim 5 wherein the solvent is a water soluble solvent.

7. A paste according to claim 6 wherein the solvent includes glycerol in an amount up to 60% of the total paste mixture.

8. A paste according to claim 6 wherein the solvent is glycerol diacetate, butanol, pentanol, propylene glycol, dipropylene glycol, methoxyethanol, ethoxyethanol, ethylene carbonate, 1,2-propanediol carbonate with 0 to 60% of glycerol based on the total paste mixture.

9. A paste according to claim 5 wherein the filler is finely divided silica.

10. A paste according to claim 2 wherein the solvent is a water soluble solvent.

11. A paste according to claim 10 wherein the solvent contains at least one alcoholic hydroxyl group.

12. A paste according to claim 2 wherein the solvent comprises glycerol diacetate, propylene glycol, methoxyethanol, ethoxyethanol, 1,2-propanediol carbonate, ethylene carbonate, butanol, pentanol or dipropylene glycol.

13. A paste according to claim 2 wherein the biologically active drug substance is a local anesthetic.

14. A paste according to claim 13 further including a flavoring agent.

15. A paste according to claim 2 wherein the filler has a particle size of 0.1 to 100 microns.

16. A paste according to claim 15 wherein the diester is present in an amount up to 1% in the copolymer.

17. A paste according to claim 1 wherein the filler is activated carbon.

18. A paste according to claim 17 wherein the diester is present in an amount up to 1% in the copolymer.

* * * * *